(12) United States Patent
Blase

(10) Patent No.: US 6,536,063 B1
(45) Date of Patent: Mar. 25, 2003

(54) GUIDE CHANNEL STRUCTURE

(75) Inventor: Günter Blase, Bergisch Gladbach (DE)

(73) Assignee: Igus Spritzgussteile für die Industrie GmbH, Köln (DE)

( * ) Notice: Subject to any disclaimer, the term of this patent is extended or adjusted under 35 U.S.C. 154(b) by 0 days.

(21) Appl. No.: 09/446,745

(22) PCT Filed: Jul. 15, 1998

(86) PCT No.: PCT/DE98/01973

§ 371 (c)(1),
(2), (4) Date: Apr. 18, 2000

(87) PCT Pub. No.: WO99/04183

PCT Pub. Date: Jan. 28, 1999

(30) Foreign Application Priority Data

Jul. 17, 1997 (DE) .......................... 197 30 548

(51) Int. Cl.⁷ .............................. E01D 15/00
(52) U.S. Cl. ............... 14/31; 191/126; 248/52
(58) Field of Search ........ 191/12 C, 2, 12 R, 191/1; 248/52, 51, 49; 14/31

(56) References Cited

U.S. PATENT DOCUMENTS

| | | | | |
|---|---|---|---|---|
| 1,827,916 A | * | 10/1931 | Stevens | 14/31 |
| 3,994,373 A | * | 11/1976 | Loos et al. | 191/12 C |
| 5,421,051 A | * | 6/1995 | Patten | 14/37 |
| 6,119,836 A | * | 9/2000 | Blase | 104/140 |

FOREIGN PATENT DOCUMENTS

| | | | |
|---|---|---|---|
| DE | 12 96 477 | | 5/1969 |
| DE | 1296477 A | * | 5/1969 |
| DE | 297 06 670 | | 6/1997 |
| DE | 29706670 U1 | * | 7/1997 |

* cited by examiner

*Primary Examiner*—S. Joseph Morano
*Assistant Examiner*—Frantz F. Jules
(74) *Attorney, Agent, or Firm*—Drinker Biddle & Reath LLP

(57) ABSTRACT

In a guide channel structure, for instance for an energy transmission chain, designed for fastening on a substructure which, as on a crane with pivotable jib, for example, displays a stationary section and a section pivotable about a first axis of rotation (8), a stationary structural element (6) for fastening on the stationary section of the substructure and a movable structural element (7) for fastening on the pivotable section of the substructure are provided, as well as an intermediate structural element (9) located between the two structural elements (6, 7), which is connected to the movable structural element (7) in a manner permitting pivoting about a second axis of rotation (10), where the parts are coupled by a control device in such a way that, when pivoting the substructure, the movable structural element (7) and the intermediate structural element (9) move past each other.

12 Claims, 5 Drawing Sheets

GUIDE CHANNEL STRUCTURE

FIELD OF THE INVENTION

The invention relates to a guide channel structure which can be fastened to a substructure, with a guide channel composed of long, parallel side elements, between which an object can be laid and moved.

BACKGROUND OF THE INVENTION

Guide channel structures of this kind are particularly used for laying and guiding energy transmission chains, which are used to accommodate flexible supply lines for electricity, gases, liquids and the like and lead these from a stationary source to a movable energy consumer. They are particularly used where the energy transmission chains have long travel paths, e.g. in materials handling, crane installations and other machines where an energy consumer travels long distances.

During the travel motion of the consumer, the energy transmission chains, which are flexible in at least one direction, are subjected to an unrolling and rerolling motion in the guide channels via a driving device located on the movable energy consumer. In this context, during the rerolling motion when travelling over long paths, the upper section of the energy transmission chain, known as the upper strand, moves in sliding fashion on the lower section, known as the lower strand, lying in the guide channel. If the fixed connecting element of the energy transmission chain is mounted in the middle of the travel path in the guide channel, the upper strand slides on the lower strand over one half of the travel path. In order to ensure low-friction running of the energy transmission chain, continuing at the same height over the other half of the travel path, the guide channels are provided with a sliding device in the corresponding area, this being located on the inner walls of the side elements, so that the upper strand can be moved on the sliding device.

Flexible energy pipes can also be guided on the sliding device instead of energy transmission chains.

Guide channel structures of the kind mentioned at the start are also suitable for laying and moving other objects subjected to sliding guidance with lateral restriction, e.g. sliding carriages, transported goods and transport containers.

Hitherto known guide channel structures are fastened to the substructure in stationary fashion. To this end, the guide channel is fixed on the substructure, e.g. a base plate, either directly or using mounting brackets (DE 297 06 670 U1).

However, there are fields of application for energy transmission chains and other objects permitting sliding movement where linear guidance in a channel is desirable, but where some sections of the channel and its substructure must permit opening and reclosing for certain purposes. This is necessary, for example, in the case of bridges on which an energy consumer can be moved and which must be opened to allow the passage of an object moving in the direction transverse to the bridge. Particularly in the case of harbour cranes with relatively long jibs, on which a crab travels back and forth and which must be swung up in order to allow the passage of a ship, it is desirable to guide the supply lines leading to the crab through an energy transmission chain sliding in a channel structure. In this case, the substructure consists of a stationary section and a pivotable section running along the jib.

SUMMARY OF THE INVENTION

The task of the present invention is to create a guide channel structure which is suitable for sections of the substructure which can be pivoted relative to one another.

According to the invention, this task is solved in that the guide channel structure consists of a stationary structural element for fastening on a stationary section of the substructure, a movable structural element for fastening on a section of the substructure which can be pivoted about a first axis of rotation in relation to the stationary section, and an intermediate structural element located between the stationary structural element and the movable structural element, which is connected to the movable structural element in a manner permitting pivoting about a second axis of rotation parallel to the first axis of rotation, where the stationary, movable and intermediate structural elements each display channel sections whose face ends lie flush against each other on the inner sides of the side elements when the substructure is not pivoted, the second axis of rotation for the intermediate structural element is located on the side of the guide channel pointing in the direction of pivoting and, depending on the position of the first axis of rotation for the pivotable section of the substructure, the opposite face ends of the channel sections of the movable structural element and of the intermediate structural element are located at an angle in the direction of pivoting and the pivoting motion of the intermediate structural element is coupled to the movement of the pivotable section of the substructure and of the movable structural element by means of a control device in such a way that, when pivoting this section of the substructure, the movable structural element and the intermediate structural element move past each other.

The control device preferably displays a mechanical coupling. This makes it possible to achieve particularly simple coupling of the intermediate structural element to the movement of the pivotable section of the substructure or of the movable structural element, without requiring a separate drive for the pivoting movement of the intermediate structural element. There is no need for a more extensive control device.

However, other types of coupling are also open to consideration where, for example, the intermediate structural element is driven electrically or hydraulically as a simultaneous function of the movement or the drive of the pivotable section of the substructure. This solution includes control devices suitable for this purpose.

In a customary application, e.g. in crane installations, the first axis of rotation for the pivotable section of the substructure (e.g. the jib) and the second axis of rotation for the intermediate structural element are positioned horizontal to the substructure. The pivotable section of the substructure (jib) is then pivoted vertically. If upward pivoting takes place, the second axis of rotation is located on the upper side of the guide channel or above it; in the case of downward pivoting, the second axis of rotation must be provided on the underside of the guide channel or below it. In addition, lateral pivoting of the substructure and the guide channel is open to consideration, in which case the second axis of rotation is located on one of the two sides of the guide channel or outside the guide channel.

If a mechanical coupling is used, it preferably displays a lever arm located on the intermediate structural element and a thrust element which is articulated to the movable structural element and acts on the lever arm in articulated fashion. When the substructure is pivoted, the movable structural element attached to it acts via the thrust element and the lever arm, exerting a torque on the intermediate structural element in the corresponding direction. Depending on the location of the first axis of rotation in relation to the guide channel structure, the geometry of the intermediate structural element must be dimensioned, and the opposite face ends of the channel sections of the movable structural element and the intermediate structural element arranged at an angle in the longitudinal direction, in such a way that the movable structural element and the intermediate structural element move over one another when the substructure is pivoted.

In an advantageous configuration of the mechanical coupling, the lever arm is located in the region of the end of the intermediate structural element opposite the movable structural element and essentially extends vertically upwards from this point, where the thrust element extends from a pivot point located on or above the upper side of the movable structural element to a pivot point located at the free end of the lever arm and runs laterally outside the intermediate structural element and the lever arm.

Particularly good force conditions are achieved by having a ratio of between 0.3 and 0.45 between the height of the lever arm and the distance between the pivot point of the thrust element on the movable structural element and the foot of the lever arm.

The stationary, movable and intermediate structural elements expediently have a self-supporting frame for the channel sections located therein which absorbs the forces for pivoting the intermediate structural element. As a result of this frame, the forces in question act only on the intermediate structural element and on the adjacent movable and stationary structural elements of the guide channel structure. The parts of the guide channel structure lying beyond these structural elements are not stressed by these forces.

In a preferred configuration, the two ends of the frame are fastened to the substructure, forming interfaces to the adjacent parts of the guide channel structure where it continues on the stationary and pivotable sections of the substructure, these parts of the guide channel structure not being exposed to the forces occurring during pivoting of the intermediate structural element. The stationary, movable and intermediate structural elements interconnected via the second axis of rotation and the coupling thus form an independent structural unit which can be located between ordinary guide channel sections at the appropriate point in a pivotable substructure. The structural unit can be completely assembled by the manufacturer and fastened to the substructure on-site without requiring any additional assembly work.

A device for precise, flush alignment of the ends of the relevant channel sections is preferably provided at the opposite face ends of the movable and intermediate structural elements. This device ensures that the ends of the channel sections are precisely aligned with each other, even after a large number of movement cycles, so that the inner sides of the guide channel, in particular, display no irregularities at these points which could in the long term lead to greater abrasion and to damage of the objects laid and movable therein.

This device can, for example, display a guide groove provided on the side of one structural element, running in its direction of pivoting and extending over this side, and a centring element located on the other structural element which essentially engages this groove over its entire length when the elements are moved in relation to each other. Owing to the fact that the centring element engages the full length of the guide groove extending over the entire corresponding side when the movable structural element and the intermediate structural element are moved, optimum lateral stability is achieved in the event of lateral forces, e.g. strong winds or other horizontal stresses.

Furthermore, lateral overlapping elements can be provided on the opposite ends of the stationary, movable and intermediate structural elements, in order to close any gaps between the structural elements.

Finally, the end of the intermediate structural element opposite to the stationary structural element can be provided with a flap which closes off the channel section of the stationary structural element when the intermediate structural element is pivoted up. This prevents the ingress of foreign bodies into the cavity of the stationary guide channel when pivoting the substructure and the channel sections coupled to it.

BRIEF DESCRIPTION OF THE DRAWINGS

A practical example of the invention is described in more detail below on the basis of the drawings. The drawings show the following.

DETAILED DESCRIPTION OF THE PREFERRED EMBODIMENTS

Figure 1:
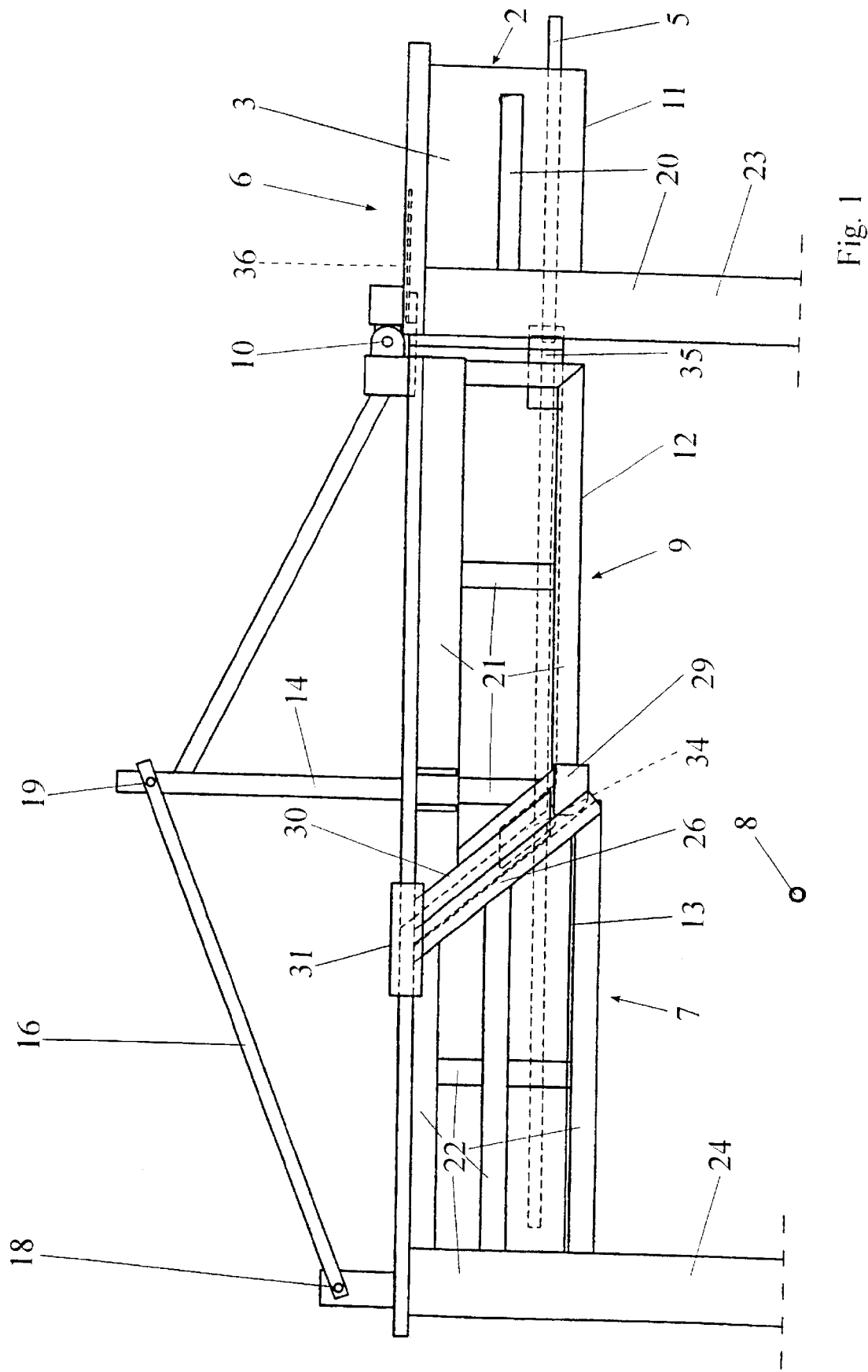
FIG. 1 A side view of the practical example in the closed state.

The practical example described below and illustrated in the drawings is a guide channel structure for laying and moving an energy transmission chain 1.

The guide channel structure comprises guide channel 2 with long, parallel side elements 3 and 4, between which energy transmission chain 1 can be laid and moved on sliding rails 5.

As can be seen from FIG. 1, for example, the guide channel structure consists of a stationary structural element 6 for fastening to a stationary section of a substructure (not shown in the drawing), e.g. a crane installation, a movable structural element 7 for fastening to a section of the substructure pivotable in relation to the stationary section about a first axis of rotation 8, and an intermediate structural element 9, located between stationary structural element 6 and movable structural element 7, which is connected to movable structural element 7 in pivoting fashion about a second axis of rotation 10, parallel to the first axis of rotation 8. The stationary structural element 6, the movable structural element 7 and the intermediate structural element 9 each display channel sections 11, 12 and 13, respectively, the face ends of which lie flush against each other on the inner sides of side elements 3 and 4 when the substructure is in the non-pivoted state illustrated in FIG. 1.

In a crane installation with an upward-pivoting jib forming the pivotable section of the substructure, the first axis of rotation 8 is located horizontally. The second axis of rotation 10 for intermediate structural element 9 is located on the side of the guide channel facing in the direction of pivoting, i.e. on the upper side of the guide channel.

As illustrated in detail in FIGS. 1 to 4, depending on the location of the first axis of rotation 8 of the substructure in relation to the guide channel structure, intermediate structural element 9 is dimensioned in such a way, and the opposite sides of channel sections 13 and 12 of movable structural element 7 and of intermediate structural element 9 are located at an angle in the longitudinal direction, in such a way that, on the basis of a mechanical coupling between these two structural elements 7 and 9, described below, these two structural elements 7 and 9 move over each other when pivoting the substructure.

To this end, the mechanical coupling displays lever arms 14 and 15 located on both sides of intermediate structural element 9, and thrust elements 16 and 17 on both sides in the form of rods which are articulated to movable structural element 7 and act on lever arms 14 and 15 in articulated fashion. Lever arms 14 and 15 are located in the region of the end of intermediate structural element 9 opposite movable structural element 7 and essentially extend vertically upwards from this point, where thrust elements 16 and 17 extend from a pivot point 18 located on the upper side of movable structural element 7 to a pivot point 19 located at the free end of lever arms 14 and 15 and run laterally outside intermediate structural element 9 and lever arms 14 and 15.

Figure 2:
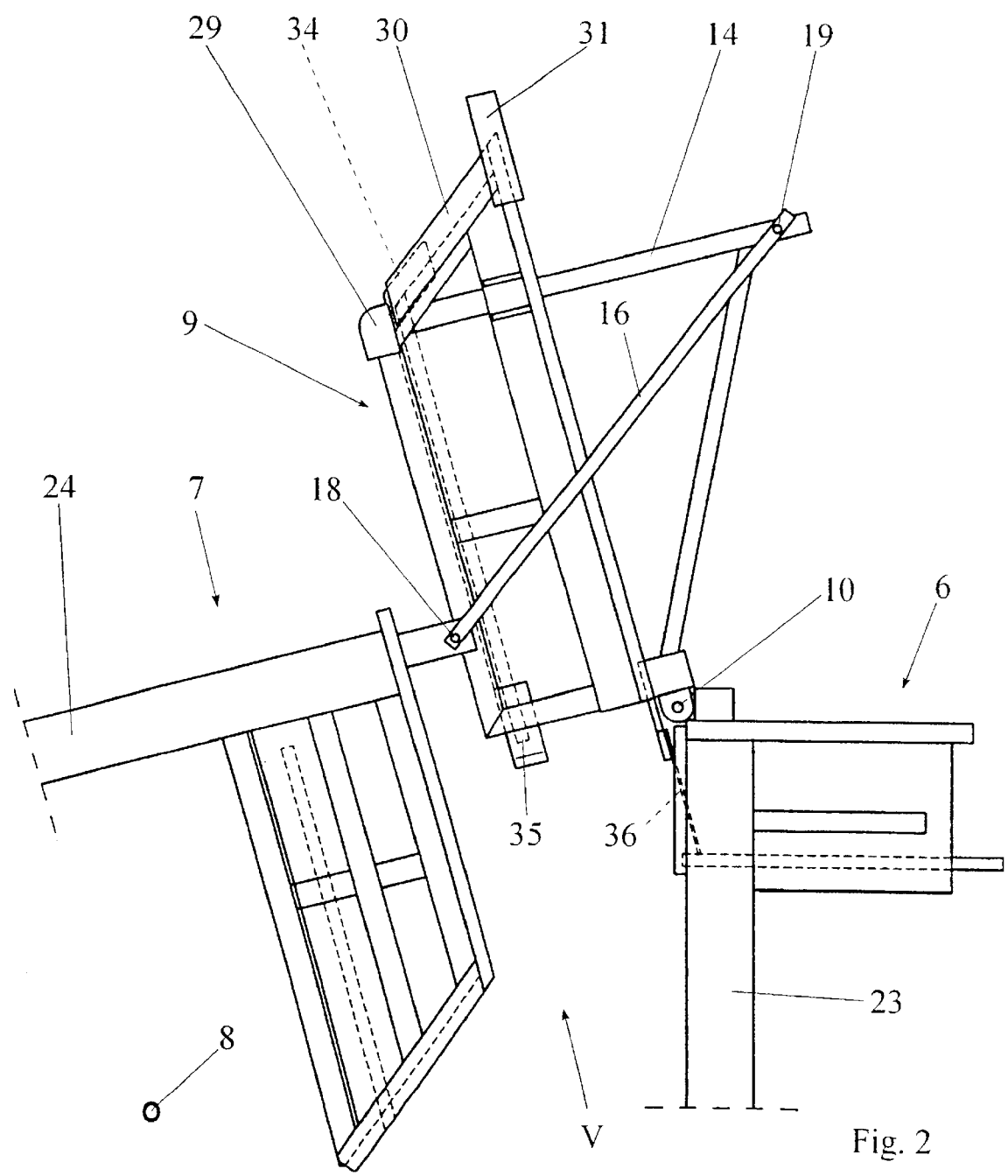
FIG. 2 A side view as per FIG. 1 in the opened state.
Figure 4:
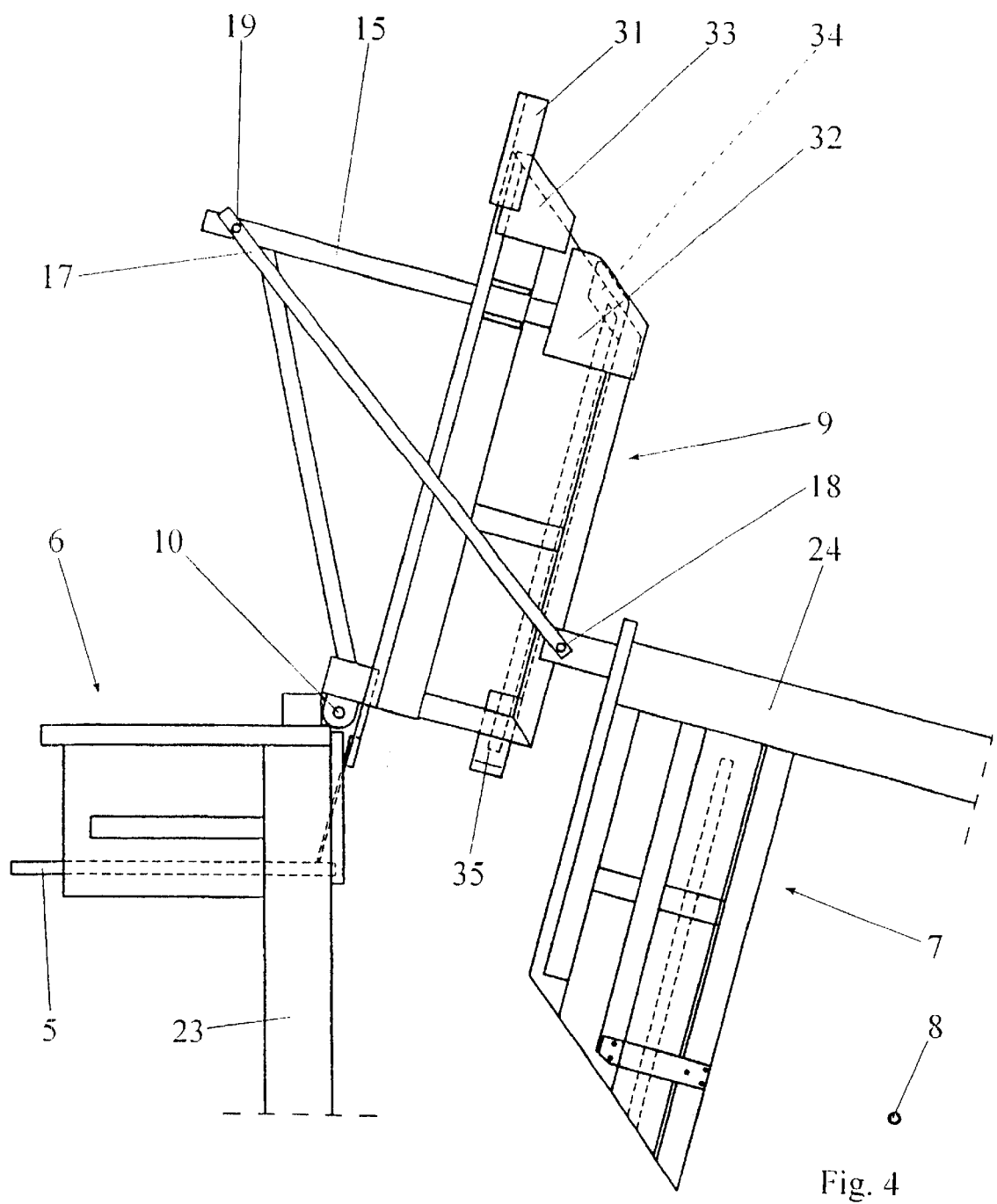
FIG. 4 A side view as per FIG. 3 in the opened state.

When the substructure (not shown in the drawing) is pivoted about the first axis of rotation 8, movable structural element 7 attached to it acts via thrust elements 16 and 17 and lever arms 14 and 15, exerting a torque on intermediate structural element 9, which is consequently pivoted upwards over movable structural element 7, as illustrated in FIGS. 2 and 4. A particularly favourable torque is obtained if the ratio between the height of the lever arm and the distance between pivot point 18 and the foot of lever arm 14 or 15 is approx. 0.4.

Structural elements 6, 7 and 9 of the guide channel structure each have a self-supporting frame 20, 21 and 22, respectively, for channel sections 11, 12 and 13, respectively, located therein which absorbs the forces for pivoting intermediate structural element 9. Frame 20 for stationary structural element 6 is firmly connected to the stationary section of the substructure (not shown in the drawing) via a vertical, tubular frame element 23. On the other side, frame 22 of movable structural element 7 is likewise fastened to the pivotable section of the substructure via a vertical, tubular frame element 24. Structural elements 6, 7 and 9, which are interconnected via the second axis of rotation 10 and the mechanical coupling, thus form an independent structural unit which can be completely assembled by the manufacturer and installed on-site on the given substructure, e.g. a crane installation with pivotable jib.

Figure 5:
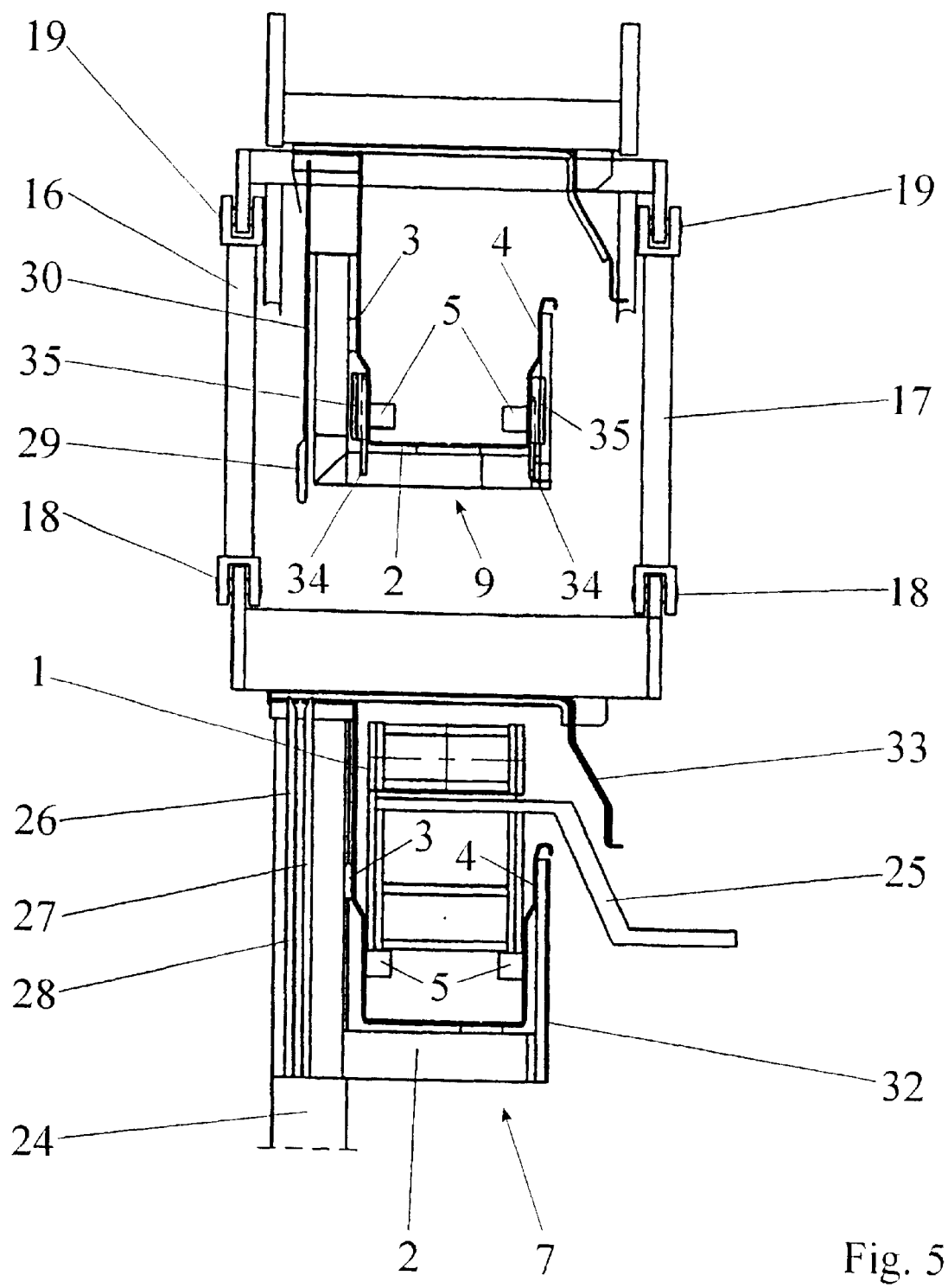
FIG. 5 A face-end view in the direction of arrow A in FIG. 2.

As can be seen in particular from FIG. 5 in conjunction with FIG. 2, frame elements 23 and 24 are located on the side of the guide channel structure which faces away from a driving device 25 of energy transmission chain 1, which is mounted on the movable energy consumer.

As is also indicated in the drawings, the opposite face ends of movable structural element 7 and intermediate structural element 9 are provided with a device for precise, flush alignment of the ends of the associated channel sections 12 and 13.

On the side of the guide channel structure facing away from driving device 25 of energy transmission chain 1, this device has two guide strips 26 and 27 on movable structural element 7, which extend over the entire height of the corresponding structural element 7 and form a guide groove 28 laying between them, as can be seen in FIG. 5, in particular.

The lower area of the corresponding side of the opposite intermediate structural element 9 is provided with a plate-shaped centring element 29 (FIGS. 2 and 5), which engages guide groove 28 over its entire length when movable and intermediate structural elements 7 and 9 are moved. When pivoting back the two structural elements 7 and 9, centring element 29 acts as a guide locator when entering guide groove 28, then sliding further in the guide groove up to the position illustrated in FIG. 1 as the return pivoting motion continues.

Located above centring element 29 on the corresponding side of intermediate structural element 9 is a guide spring 30, extending over the remaining length of the side, which likewise engages guide groove 28. Guide spring 30 forms an overlap on the corresponding side for closing the lateral gap between structural elements 7 and 9.

Additionally provided on the upper side of the intermediate structural element above guide spring 30 is an overlapping plate 31, which closes off the upper side of the corresponding connection point between the two structural elements 7 and 9.

Trapezoidal protective covers 32 and 33, forming a downward-pointing gap to allow passage of driving device 25, are provided on intermediate structural element 9 on the other side of the guide chain structure on which, as shown in FIG. 5, driving device 25 of energy transmission chain 1 engages guide channel 2.

As shown in FIGS. 1 and 5, flank guides 34 and 35 are provided at both ends of intermediate structural element 9, which spread slightly outwards and the outer sides of which make contact at the ends of channel sections 11 and 13 of stationary and movable structural elements 6 and 7. Flank guides 34 and 35 are intended for precise, flush insertion of structural elements 6, 7 and 9 in the final phase of return pivoting.

Figure 3:
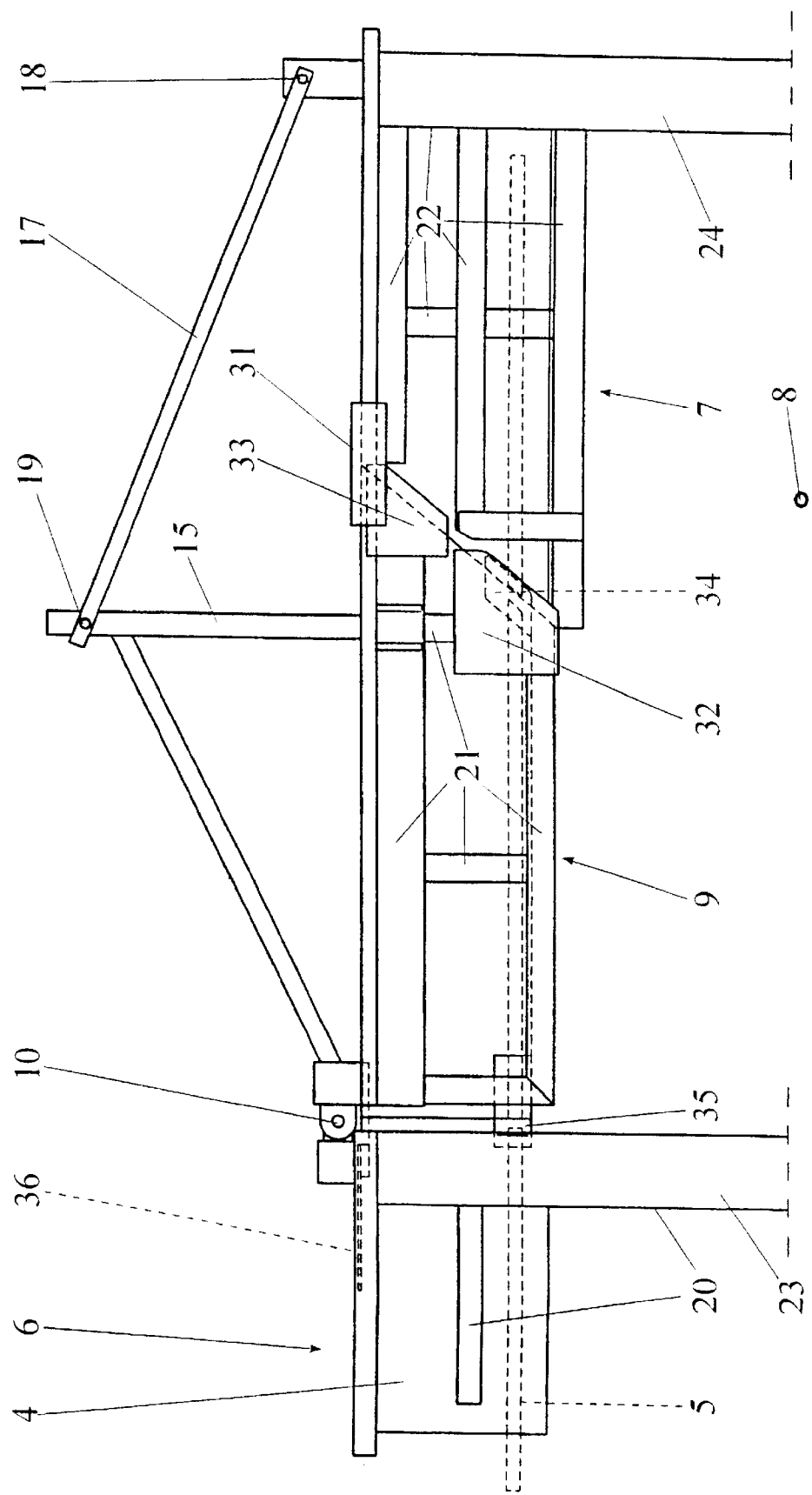
FIG. 3 A view of the opposite side of the practical example.

A flap 36 is located on the upper side of intermediate structural section 9 on the end opposite to stationary structural element 6, said flap 36 running horizontally when the guide channel structure is in the non-pivoted state illustrated in FIGS. 1 and 3, and sealing off channel section 11 of stationary structural element 6 in the upward-pivoted state of the guide channel structure illustrated in FIGS. 2 and 4.

GUIDE CHANNEL STRUCTURE

List of Reference Numbers

1 Energy transmission chain
2 Guide channel
3 Side element
4 Side element
5 Sliding rail
6 Stationary structural element
7 Movable structural element
8 First axis of rotation
9 Intermediate structural element
10 Second axis of rotation
11 Channel section
12 Channel section
13 Channel section
14 Lever arm
15 Lever arm
16 Thrust element
17 Thrust element
18 Pivot point
19 Pivot point
20 Frame
21 Frame
22 Frame
23 Frame element
24 Frame element 25 Driving device
26 Guide strip
27 Guide strip
28 Guide groove
29 Centring element
30 Guide spring
31 Overlapping plate
32 Protective cover
33 Protective cover
34 Flank guide
35 Flank guide
36 Flap

What is claimed is:

1. A guide channel structure which can be fastened to a substructure, with a guide channel composed of long, parallel side elements having inner sides, between which a flexible object can be laid and moved, the guide channel structure comprising: a stationary structural element for fastening on a stationary section of the substructure, a movable structural element for fastening on a pivotable section of the substructure for pivot about a first axis of rotation in relation to the stationary section, and an intermediate structural element located between the stationary structural element and the movable structural element, which is connected to the movable structural element in a manner permitting pivoting about a second axis of rotation parallel to the first axis of rotation, where the stationary, movable and intermediate structural elements each display channel sections whose face ends lie in flush contact against each other on the inner sides of the side elements when the substructure is in a non-pivoted position, the pivot of the intermediate structural element coupled to the pivot of the movable structural element by a control device, the second axis of rotation for the intermediate structural element is located on a side of the guide channel to which the intermediate structural element is pivoted from the non-pivoted position, each of the channel section face ends of the intermediate and movable structural elements that contact each other is oriented at an angle with respect to the longitudinal direction of the respective structural element such that the movable structural element and the intermediate structural element move past, each other when the substructure is pivoted from the non-pivoted position.

2. A guide channel structure according to claim 1, wherein the control device displays a mechanical coupling.

3. A guide channel structure according to claim 2, wherein the first and second axes of rotation are pitioned horizontal to the substructure.

4. A guide channel structure according to claim 2, wherein the mechanical coupling displays a lever arm located on the intermediate structural element and a thrust element which is articulated to the movable structural element and acts on the lever arm in articulated fashion.

5. A guide structure according to claim 3 wherein the lever arm is located in the region of the end of the intermediate structural element opposite the movable structural element and essentially extends vertically upwards from this point, and the thrust element extends from a pivot point located on or above the upper side of the movable structural element to a pivot point located at the free end of the lever arm where the thrust element runs laterally outside the intermediate structural element and the lever arm.

6. A guide channel structure according to claim 5, wherein the ratio between the length of the lever arm and the distance between the pivot point and the thrust element on the movable structural element and the foot of the lever arm is between 0.3 and 0.45.

7. A guide structure according to claim 1 wherein the stationary, movable and intermediate structural elements have a self-supporting frame for the channel sections located therein which absorbs the forces for pivoting the intermediate structural element.

8. A guide channel structure according to claim 7, wherein the two ends of the frame are fastened to the substructure and form interfaces to the adjacent guide channel sections located on the stationary and pivotable sections of the substructure.

9. A guide channel structure according to claim 1 further comprising a guide device for precise, flush alignment of the ends of the relevant channel sections, the guide device provided at the opposite face ends of the movable and intermediate structural elements.

10. A guide channel structure according to claim 9, wherein the guide device displays a guide groove provided on the side of one structural element, running in its direction of pivoting and extending over the side, and a centering element located on the other structural element, which engages the guide groove over its entire length when the elements are moved in relation to each other.

11. A guide structure according to claim 1 wherein lateral overlapping elements are provided on the opposite ends of the stationary, movable and intermediate structural elements in order to close any gaps between the structural elements.

12. A guide structure according to claim 1 wherein the end of the intermediate structural element opposite to the stationary structural element is provided with a flap which closes off the channel section of the stationary structural element when the intermediate structural element is pivoted up.

* * * * *